(12) United States Patent
Kerber et al.

(10) Patent No.: US 12,319,415 B2
(45) Date of Patent: Jun. 3, 2025

(54) AIRCRAFT WITH BELLY-LANDING PROTECTION

(71) Applicant: Airbus Operations GmbH, Hamburg (DE)

(72) Inventors: Markus Kerber, Hamburg (DE); Marc Wesseloh, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 18/343,830

(22) Filed: Jun. 29, 2023

(65) Prior Publication Data

US 2024/0002060 A1     Jan. 4, 2024

(30) Foreign Application Priority Data

Jun. 30, 2022   (EP) .................................. 22182441.0

(51) Int. Cl.
| | | |
|---|---|---|
| B64D 25/00 | (2006.01) | |
| B64C 1/06 | (2006.01) | |
| B64C 1/18 | (2006.01) | |

(52) U.S. Cl.
CPC .............. B64D 25/00 (2013.01); B64C 1/068 (2013.01); B64C 1/18 (2013.01)

(58) Field of Classification Search
CPC .. B64C 1/12; B64C 1/18; B64D 45/04; B64D 2045/009; B64D 1/16
See application file for complete search history.

(56) References Cited

U.S. PATENT DOCUMENTS

| | | | |
|---|---|---|---|
| 4,811,793 A | 3/1989 | Lokken | |
| 5,431,990 A * | 7/1995 | Haynes | ..................... B32B 7/02 244/119 |
| 2004/0050723 A1 | 3/2004 | Wilke | |
| 2008/0017392 A1 | 1/2008 | Fallis et al. | |
| 2010/0012773 A1 | 1/2010 | Im | |
| 2018/0229853 A1 | 8/2018 | Sarkar et al. | |
| 2020/0031450 A1 | 1/2020 | Slaton | |

FOREIGN PATENT DOCUMENTS

| | | |
|---|---|---|
| GB | 645514 A | 11/1950 |
| JP | H03292290 A | 12/1991 |
| JP | 2018144324 A  * | 9/2018 |
| WO | 2017064209 A2 | 4/2017 |

OTHER PUBLICATIONS

European Search Report for corresponding European Patent Application No. 22182441 dated Dec. 9, 2022; priority document.

* cited by examiner

*Primary Examiner* — Timothy D Collins
*Assistant Examiner* — Eric Acosta
(74) *Attorney, Agent, or Firm* — Greer, Burns & Crain, Ltd.

(57) ABSTRACT

A honeycomb structure including a first external side, a second external side, and an anti-friction agent buffer for receiving an anti-friction agent. An opening to an anti-friction agent inlet and an opening to an air outlet are present on the first external side. This honeycomb structure may be useful in an aircraft as part of a belly-landing system for the aircraft.

13 Claims, 3 Drawing Sheets

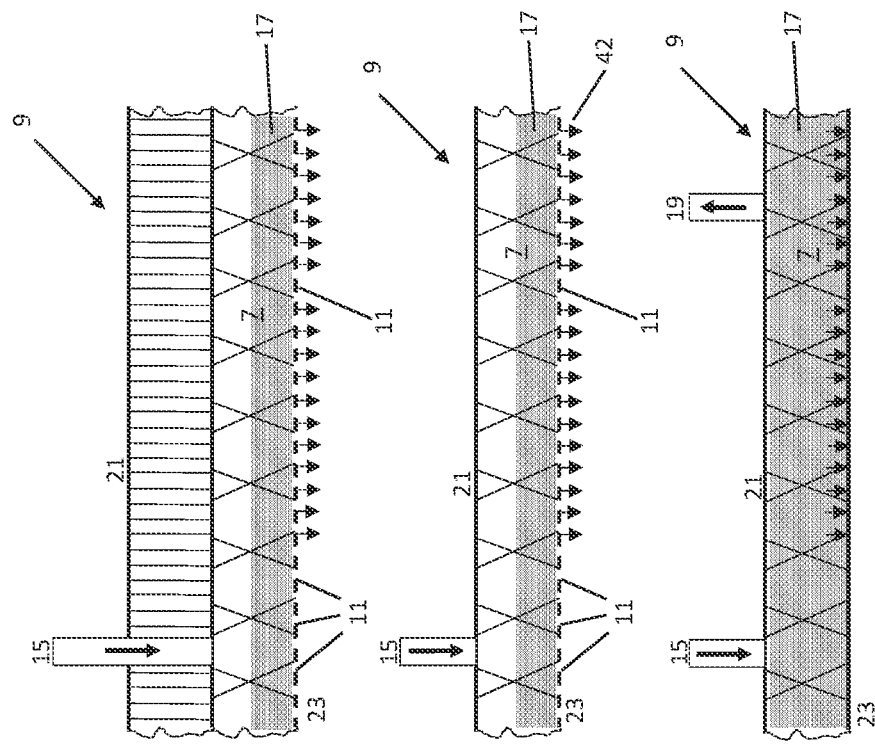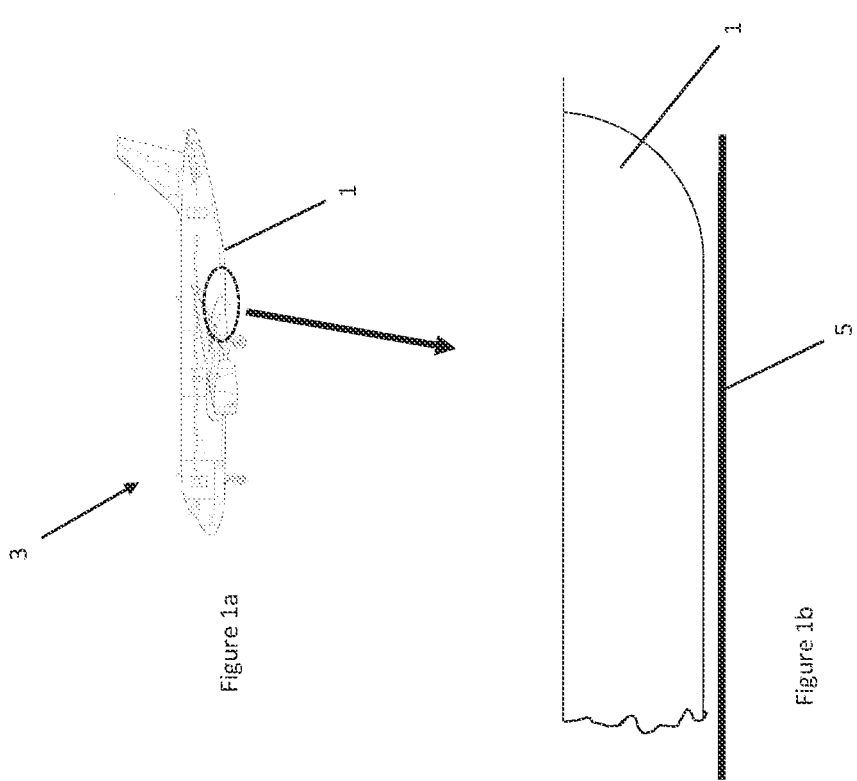

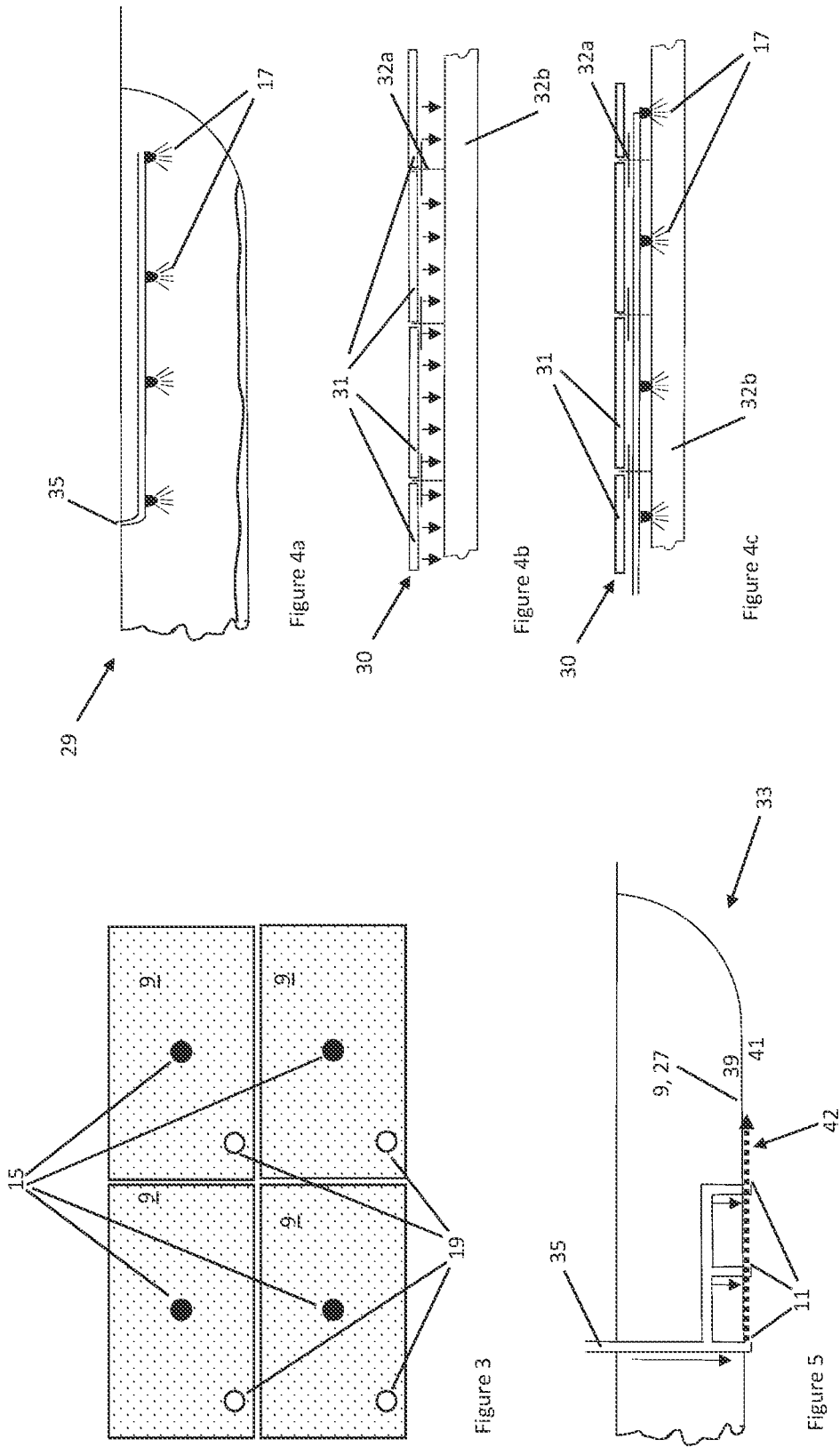

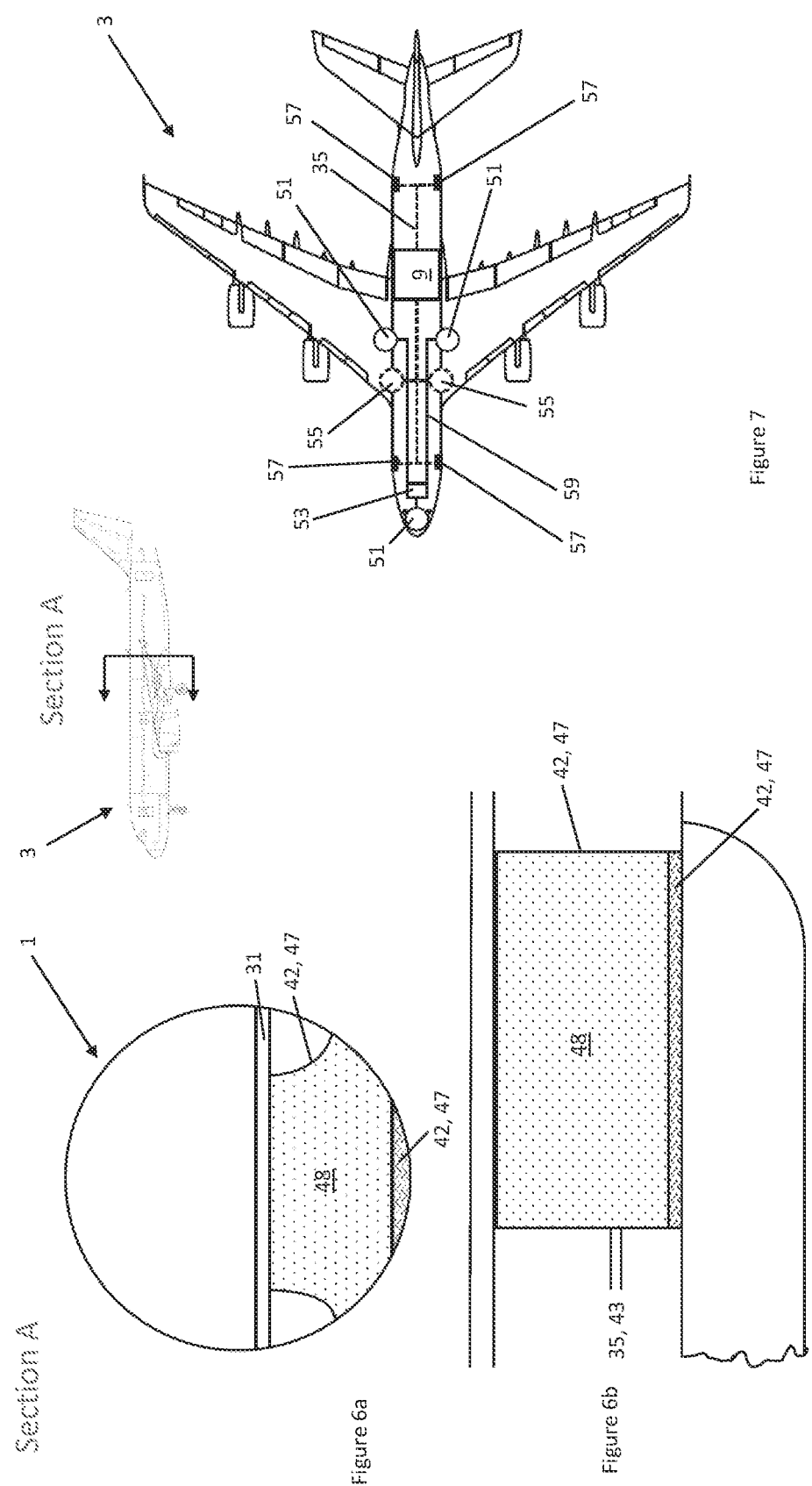

AIRCRAFT WITH BELLY-LANDING PROTECTION

CROSS-REFERENCES TO RELATED APPLICATIONS

This application claims the benefit of the European patent application No. 22182441.0 filed on Jun. 30, 2022, the entire disclosures of which are incorporated herein by way of reference.

FIELD OF THE INVENTION

The present application relates to a honeycomb structure, to an aircraft having such a honeycomb structure, to a belly-landing protection system for such an aircraft, and to a method for generating an anti-friction agent film on a face of an aircraft. The present application relates especially to an improved protection for the so-called rear center tank (RCT), thus the rear central tank of an aircraft.

BACKGROUND OF THE INVENTION

An electric switch for activating a protection mechanism against damage in the event of belly landings is known from GB645514.

JP03292290 relates to a belly-landing safety device in which a board having a low coefficient of friction by means of a drive device is moved into position so that the board mitigates friction when an aircraft carries out a belly landing and slides on a runway due to an accident.

Furthermore, known from US20100012773 is an aircraft structure having a honeycomb structure of which the mesh structure can comprise a multiplicity of fire-retardant foam boards between the pipes.

While the known protection devices serve for preventing a fire, it is, however, an object of the present application to provide more improved protection for an aircraft performing a belly landing.

This object is achieved by a honeycomb structure, an aircraft having such a honeycomb structure, an aircraft having a fuselage cladding, a belly-landing protection system for an aircraft, and a method for generating an anti-friction agent film on a face of an aircraft, all as described in the description and claims herein.

It is a fundamental objective of the present invention to comprehensively protect the tank of an aircraft in several ways in the event of a belly landing. The most challenging scenario here is an emergency landing immediately after take-off, without the time or the technical feasibility of dumping fuel (e.g., via a jettison system).

On the one hand, the present invention is to enable sliding of the aircraft fuselage so that fire risk and damage are reduced or avoided. On the other hand, a system comprising various water injections is to aid in reducing the risk of fire or damage in the event of a belly landing. Various types of water or foam that are placed in and outside the aircraft are intended to cool the fuselage in the process.

In a first aspect, the application relates to a honeycomb structure having a first external side and a second external side. The honeycomb structure furthermore has an anti-friction agent buffer for receiving an anti-friction agent, wherein an opening to the anti-friction agent inlet and an opening to the air outlet are present on the first external side. With the aid of this arrangement, it is possible to fill the anti-friction agent buffer with the anti-friction agent without air bubbles settling in the honeycomb structure, the air bubbles then blocking the valuable available space for receiving the anti-friction agent. In the simplest case, a honeycomb structure filled in this way, for example as an external component part of an aircraft fuselage, can be destroyed solely by the force of the impact on the second external side and release the anti-friction agent as a result. A typical potential anti-friction agent volume here is a total of approximately 200 liters per aircraft. The anti-friction agent is preferably the potable water and gray water which are carried along anyway, so that available onboard resources are utilized, and the aircraft weight is not unnecessarily increased.

In a second aspect, the honeycomb structure on the second external side furthermore has at least one perforation. This at least one perforation in the normal state (thus, in the absence of an emergency landing) is in a closed state. The perforation can be brought to an opened state by overpressure in the anti-friction agent buffer. The at least one perforation thus represents a predetermined breaking point. When the (at least one) perforation is open, anti-friction agent by means of the overpressure can make its way from the anti-friction agent buffer through the at least one perforation onto the second external side. In this way, it is possible to release the anti-friction agent only at a desired point in time, so as to have as much anti-friction agent is possible available as a protection against damage to/fire of the tank. This can be the case, for example, when the pilot or an avionics systems of an aircraft establishes that the landing gear is not extended, despite the aircraft already being in descent and having undershot a specific altitude and/or having attained a specific descent speed. The overpressure is created by a greater volumetric flow of anti-friction agent being introduced into the anti-friction agent buffer than is able to escape from the anti-friction agent buffer. The at least one perforation is, preferably, made from the same material as the second external side of the honeycomb, but is thinner so that the perforation functions like a predetermined breaking point. These predetermined breaking points can be applied by a (non-reinforced) plastics material cover layer, or as a spray filler (0.05 to 0.15 mm) by painting.

The honeycomb structure preferably comprises a first honeycomb panel and a second honeycomb panel, wherein the first honeycomb panel comprises the first external side of the honeycomb structure, and the second honeycomb panel comprises the second external side of the honeycomb structure. In the simplest embodiment, two honeycomb panels thus form the honeycomb structure according to the invention. Of course, more than two panels are also conceivable; however, the honeycomb structure will also become heavier in this instance. The honeycomb panels that form the honeycomb structure can, in principle, of course, also comprise even further embedded component parts (shielded from the anti-friction agent) of other aircraft systems, such as pipes or wire looms, for example, which have been embedded in the honeycomb system in a space-saving manner. However, this is expedient only to the extent that the anti-friction agent buffer volume is not unnecessarily reduced by the additional elements in the honeycomb structure.

It is to be mentioned in principle that the present idea can, of course, also be implemented using a material other than a honeycomb. The structure used must be inherently permeable to an anti-friction agent (i.e., water or a fire-extinguishing agent) so that the anti-friction agent can be uniformly distributed within the honeycomb structure. The core of this structure should in any case be constructed in the manner of a honeycomb, in particular, however, be laterally permeable to an anti-friction agent or a fire-extinguishing agent.

The present invention furthermore relates to an aircraft having a cabin for receiving passengers and/or cargo with a floor, wherein the floor comprises a honeycomb structure as described above, so that the anti-friction agent located in the anti-friction agent buffer can be released by overpressure. In this way, the interior can be irrigated with anti-friction agent by way of the at least one, preferably by way of a multiplicity of, perforations. In this constellation, the anti-friction agent is advantageously fire-retardant, such as water or fire-extinguishing foam, for example. Furthermore advantageously, the honeycomb structure in spatial terms is disposed close to the tank of the aircraft so that the fire-retardant effect is used exactly where it is most urgently required in the case of an emergency. The anti-friction agent which is distributed in the fuselage by means of this sprinkler or irrigation system then is naturally concentrated at the lowest point of the fuselage cladding.

The at least one perforation preferably opens into a pipe system which is suitable for delivering the released anti-friction agent to a desired destination in or on the aircraft. As a result of the extremely compact construction mode of an aircraft, it may otherwise arise that the anti-friction agent as a result of the multiplicity of construction elements such as pipes or wire strands, for example, is backed up at a location that cannot contribute toward the protection of the RCT in the event of a belly landing. The pipe system according to the invention for distributing the anti-friction agent typically has a diameter of 1.27 to 5.08 cm (0.5 to 2 inches). The pipe system should advantageously be installed in the shortest path between the water tank and the application and have a slope in the direction of the application.

The pipe system especially preferably opens into a tank of the aircraft that is suitable for receiving fuel. If the at least one perforation is set to an opened state by overpressure, the anti-friction agent makes its way into the tank by way of the pipe system. The anti-friction agent is preferably water (density ~1 g/cm3), while the fuel has a lower density so that the denser water forms a layer in the lower region of the tank, the region being closest to the belly landing, while the fuel is disposed as a layer above the water. In this way, the fuel is protected against excessive frictional heat when the aircraft slides on the belly side.

In a further preferred embodiment, the aircraft has a fuselage cladding, wherein the fuselage cladding has an inner side and an outer side, and wherein the fuselage cladding comprises at least one of the variants of the honeycomb structure as described above. In the two simplest variants, the anti-friction agent by way of the at least one perforation thus makes its way onto the outer side of the fuselage cladding when the at least one perforation is in the opened state. A thin film which enables sliding and reduces the friction created and thus the risk of sparks is then formed on the outer side of the fuselage cladding. Alternatively or additionally to this slide system, the fuselage cladding can of course be conceived in a different or supplementary manner on different regions. For example, there is the slide system on the one hand, and at a further location of the aircraft belly the external side of the fuselage cladding is simply destroyed by the impact of the belly landing and the anti-friction agent is released in this way. The overall protection can be optimized by combining the different embodiments of the honeycomb structure and the links of the latter to a pipe system.

The aircraft according to the invention, especially preferably, comprises not only a slide system as described above, but also an irrigation system as described prior thereto, so that both protective effects reinforce or supplement one another.

The anti-friction agent preferably comprises water and/or a fire-extinguishing foam. This enables problem-free onboard transportation in an aircraft and assists in efficiently extinguishing fire or sparks.

The aircraft according to the invention preferably comprises a fresh-water tank and/or a gray-water tank, whereby water present in the latter can be brought from the fresh-water tank and/or gray-water tank into the anti-friction agent buffer by way of supply lines of a pipe system. In this way, resources which are usually available in a normal passenger aircraft are utilized in an emergency. Of course, it is also conceivable for one or a plurality of further water tanks to be installed onboard the aircraft for safety reasons, thus enlarging the water volume available in the event of a belly landing. In this way, the irrigation system and/or the slide system can be in active use over a longer period of time, thus increasing the probability that the anti-friction agent is released, or is available, at the right moment.

In a further, especially preferred design embodiment the aircraft on the outer skin thereof comprises an infeed point which opens into the pipe system. In this way, in addition to the reservoir of fire-extinguishing agent, anti-friction agent such as fire-extinguishing foam, for example, can be added from the outside by the airport fire department by way of the pipeline system so as to top up the extinguishing system. This would facilitate the evacuation of the aircraft. These external connectors are advantageously disposed on the port side or starboard side of the aircraft and/or at the nose and/or the rear, so as to be able to individually address the belly-landing situation on site, because not all sides of a belly-landed aircraft may be accessible.

The present application furthermore relates to a belly-landing protection system for an aircraft as described above, wherein the aircraft furthermore comprises: a landing gear; a radio altimeter for establishing a flight altitude of the aircraft; a landing gear detector for determining whether the landing gear is extended; and a control for maintaining a closed state of the at least one perforation and for generating an opened state of the at least one perforation, wherein the at least one perforation is brought to an opened state when the radio altimeter (during descent) establishes a specific flight altitude but the landing gear detector establishes that the landing gear is not yet extended.

The control preferably comprises a manual mechanism and/or an automatic mechanism for bringing the at least one perforation to an opened state. In the process, the pilot can, for example, set an (optional) manual pre-activation of the mechanism, which is then followed by an automatic triggering of the opening mechanism for the at least one perforation—this being triggered by the radio altimeter signal when the signal from the landing gear sensor communicates that the landing gear is in a non-extended state.

The method according to the invention for generating an anti-friction agent film on a face of an aircraft, wherein the aircraft comprises a landing gear and a honeycomb structure as described further above, comprises the following steps: establishing a specific flight altitude of the aircraft by means of a radio altimeter; establishing, by means of a landing gear detector, whether the landing gear is extended; and bringing the at least one perforation to an opened state by an overpressure of the anti-friction agent, so that anti-friction agent flows from the anti-friction agent buffer. With the aid of these method steps it is possible that a targeted release of anti-friction agent from the honeycomb structure is achieved in the form of an irrigation (sprinkler system), or in the form of a targeted application of the anti-friction agent to the second external side of the honeycomb structure. The honeycomb structure can, in principle, be disposed in the interior of an aircraft, but preferably is designed as a component part of the outer fuselage cladding, in particular as a component part of the aircraft belly cladding (i.e., of the so-called belly fairing).

In another possibility for the method according to the invention for generating an anti-friction agent film on a face of an aircraft as described above, wherein the aircraft comprises a landing gear; a honeycomb structure as described above; and a tank for receiving fuel, having an inner surface and an outer surface; wherein the face of the aircraft is the inner surface of the tank, the method comprises the following steps: establishing a specific flight altitude of the aircraft by means of a radio altimeter; establishing by means of a landing gear detector whether the landing gear is extended; and bringing the at least one perforation to an opened state by an overpressure of the anti-friction agent, so that anti-friction agent flows from the anti-friction agent buffer, wherein the anti-friction agent has a higher density than the fuel; furthermore comprising the following step of introducing the anti-friction agent through the pipe system into the tank at least partially filled with fuel, so that a lower layer with anti-friction agent and an upper layer with fuel, disposed on top of the lower layer of anti-friction agent, are formed in the tank. The anti-friction agent film here therefore advantageously offers not only fundamental protection as an extinguishing agent, but in the event of damage (when the lower region of the tank is damaged) as an anti-friction agent also protects the lower side of the tank, for example of the RCT, in that the anti-friction agent film reduces the friction and thus also the frictional sheet created. The anti-friction agent film can be a very thin layer of a few lam or nm; in principle, however, several centimeters of thickness are also conceivable. In the latter case, one may generally refer to an anti-friction agent layer rather than an anti-friction agent film.

BRIEF DESCRIPTION OF THE DRAWINGS

The invention will be explained hereunder with reference to the following drawings.

FIG. 1a shows an aircraft according to the prior art; and

FIG. 1b shows an enlarged partial sectional view of the associated aircraft fuselage with the belly fairing.

FIG. 2a shows a first embodiment of a honeycomb structure according to the invention as a closed board with a water inlet and an air outlet.

FIG. 2b shows a second embodiment of a honeycomb structure according to the invention with opened pores (opening by overpressure).

FIG. 2c shows a third embodiment of a honeycomb structure according to the invention (honeycomb structure with two honeycomb panels with perforations).

FIG. 3 shows four boards disposed next to one another, from a honeycomb structure according to the invention for an aircraft fuselage cladding.

FIG. 4a shows a partial sectional view of an aircraft fuselage with an irrigation system.

FIG. 4b shows a floor of an aircraft with a honeycomb structure according to the invention.

FIG. 4c shows a more accurate illustration of an installed irrigation system.

FIG. 5 shows a partial sectional view of an aircraft fuselage with a honeycomb structure according to the invention and a pipe system.

FIG. 6a shows a cross section of an aircraft with a tank in which the upper part is filled with an anti-friction agent and the part disposed above is filled with fuel.

FIG. 6b shows a partial sectional view of an aircraft fuselage, wherein part of a pipe system for an anti-friction agent opens into the tank.

FIG. 7 shows an aircraft with a belly-landing protection system according to the invention.

DETAILED DESCRIPTION OF THE PREFERRED EMBODIMENTS

FIG. 1 shows a fuselage 1 of an aircraft 3 which has endured a belly landing (for example, as a result of a landing gear failure), so that the fuselage cladding of the aircraft belly (belly fairing) is in direct contact with the ground 5. There is here a high risk that the rear center tank (RCT) will be damaged. Highly flammable fuel is usually contained in the tank in various quantities, depending on how much of the planned route an aircraft has already travelled, and the tank is of course still rather full, in particular, when this is an aircraft which cannot dump fuel when in flight, or there is no time left for consuming the fuel. It is thus important to minimize the following: heat, sparks, fire or other harmful effects which could lead to damage of the RCT.

According to the present invention, this objective is facilitated by a special design embodiment of the fuselage cladding, as can be seen in FIGS. 2a-c.

In principle, a respective anti-friction agent buffer 7 in the honeycomb structure 9 is intended to protect the tank. Different embodiments are possible. The honeycomb structure 9 can be closed, on the one hand. On the other hand, at least one perforation 11 can be present on the lower side 13 of the honeycomb structure 9 of the belly fairing. The honeycomb structure 9 is constructed such that the honeycomb structure 9 can be filled with anti-friction agent 17 through an opening to the anti-friction agent inlet 15. This can be implemented by a hollow structure having air discharge holes 19 such that filling with water, for example, is possible. However, the anti-friction agent filling irreversibly destroys the honeycomb structure 9; the panel thus has to be replaced after filling. The at least one perforation 11 is preferably opened by overpressure of the anti-friction agent, but can of course also be torn open by the impact.

A honeycomb structure 9 according to the invention can be seen in FIG. 2a, having a first external side 21 and a second external side 21, having an anti-friction agent buffer 7 for receiving an anti-friction agent, preferably water or extinguishing foam, wherein the opening to the anti-friction agent inlet 15 and furthermore the opening to the air outlet 19 are present on the first external side 21. In principle, it is of course also conceivable that a plurality of openings 15, 19 are present.

A further honeycomb structure 9 can be seen in FIG. 2b, wherein the honeycomb structure 9 on the second external side 23 now however has a plurality of perforations 11 which in the normal state are in a closed state. These perforations 11 here are able to be brought to an opened state by overpressure in the anti-friction agent buffer 7, so that anti-friction agent 17 from the anti-friction agent buffer 7 makes its way through the perforations 11 onto the second external side 23, forms an anti-friction agent film 42 on the latter and thus ensures lower friction for an aircraft belly sliding across the ground 5.

A further variant of the honeycomb structure 9 according to the invention is depicted in FIG. 2c. The honeycomb structure 9 here comprises a first honeycomb panel 25 and a second honeycomb panel 27, wherein the first honeycomb panel 25 comprises the first external side 21 of the honeycomb structure 9, and the second honeycomb panel 27 comprises the second external side 23 of the honeycomb structure. The honeycomb structure 9 becomes stronger and thus more stable in this way. In principle, more than two layers of the honeycomb panels are of course also conceivable.

The provision of the anti-friction agent not only enables sliding but also has the effect of cooling, this likewise contributing toward the suppression of a fire and thus toward the protection of the RCT.

FIG. 3 shows a plan view of the fundamental construction of an aircraft belly fairing, the latter here being constructed from four honeycomb structure elements 9. To be seen are in each case one opening to the anti-friction agent inlet 15 and one opening to the air outlet 19. Of course, more or fewer honeycomb structure elements 9 are also conceivable, depending on how many are required for cladding the fuselage.

FIGS. 4a, b and c, and 5 show parts of a belly-landing protection system that are preferably able to be combined with one another: an irrigation system 29 (sprinkler system) in a cabin floor or in a cargo hold ceiling 30 in FIG. 4, and a sliding system 33 (belly slide system) in the fuselage cladding in FIG. 5. (The RCT is not depicted in FIGS. 4 and 5.)

The sprinkler system preferably comprises a honeycomb structure as described above. In the latter, the pipe system 35 indicated guides the anti-friction agent into an anti-friction agent buffer (not illustrated in FIG. 4a), from where the anti-friction agent in a targeted manner is "unlocked" by generating overpressure such that the anti-friction agent/extinguishing agent 17 can exit and ensure cooling of the RCT, extinguishes the fire or (in the event of an already damaged fuselage cladding) ensures reduced friction.

As is illustrated in FIG. 4b, it is conceivable that the floor panels 31 of the cabin floor 30, which by way of seat rails 32a bear on the crossbeams 32b, contain the honeycomb structure.

Honeycomb floor panels can also be installed below the cabin floor 30, the honeycomb floor panels likewise being perforated so that the latter wet the RCT from above. However, direct irrigation in this region is also conceivable.

An irrigation system 29 which is conventional or of a very simple construction and in which an anti-friction agent 17 such as water, for example, by means of gravitation is simply provided by a pipe system 35 in the interior of the aircraft, below the cabin floor 30, can be seen in FIG. 4c, for example. Of course, this assembly can also additionally be supplemented with the honeycomb structure floor panels 31 which are illustrated in FIG. 4b and comprise an anti-friction agent buffer.

In these cases, the irrigation system 29 would also still be fit for use when the fuselage cladding is already damaged, but the interior of the cabin is still functional.

The sliding system 33 illustrated in FIG. 5 likewise uses the honeycomb structure 9 described above, having the perforations which here are illustrated as already opened. To be seen is a fuselage cladding 37, wherein the fuselage cladding has an inner side 39 and an outer side 41. The fuselage cladding 37 comprises one of the honeycomb structures 9 described above. Furthermore to be seen is a pipe system 35 through which the anti-friction agent 17 flows to the perforations 11 (indicated by the arrows in the figure), so that the anti-friction agent 17 makes its way through these perforations 11 onto the outer side 41 of the fuselage cladding when the perforations 11 are in the opened state. An anti-friction agent film 42 which ensures reduced friction and cooling of the external skin, and thus ultimately also of the RCT, is formed on the outer side 41.

A further measure can also be taken for protecting the RCT, as can be seen in FIGS. 6a (fuselage cross section with the sectional edge A) and 6b (lateral partial section of the aircraft fuselage). The pipe system 35 can lead not only to the perforations 11 present in the honeycomb structure 9, but alternatively or additionally through a corresponding supply pipe 43 also directly into the tank 45. If an anti-friction agent 17 with a greater density than that of the fuel is used, a protective anti-friction agent layer 42, 47 is formed in the lower region of the tank 45. Depending on the quantity of anti-friction agent, the anti-friction agent film in this embodiment is thus somewhat thicker than in the variant in which the anti-friction agent exits so as to be distributed through the perforations of the lower layer of the honeycomb structure. The anti-friction agent layer 42, 47 is preferably composed of water or a suitable extinguishing foam. The fuel 48 thereafter can of course not be used again without treatment.

According to the invention, the aircraft has a fresh-water tank and/or a gray-water tank, wherein the water is able to be brought from the fresh-water tank and/or gray-water tank into the anti-friction agent buffer 7 by way of supply lines. In principle however, an additional water tank may also be provided, as a result of which, however, the total weight of the aircraft is of course also increased.

Part of the belly-landing protection system 49 according to the invention for an aircraft 3 can be seen in FIG. 7. The aircraft 3 here has a landing gear; a radio altimeter for establishing a flight altitude of the aircraft; one or a plurality of landing gear detectors 51 for determining whether the landing gear is extended (main landing gear bay detector, and nose landing gear bay detector), and a control 53 for maintaining a closed state of the at least one perforation (in the honeycomb structure according to the invention) and for generating an opened state of the at least one perforation, wherein the at least one perforation is brought to an opened state when the radio altimeter (during descent) detects a specific flight altitude but the landing gear detector 51 establishes that the landing gear is not yet extended. These items of information are usually communicated by way of an electrical wiring 59; a wireless solution is of course also possible.

As a result, the pipe system 35, or the honeycomb structure elements 9, can be flooded with water from the water tank 55 immediately prior to landing (the runway being in sight), for example in the event of a failure of the landing gear. This is performed as late as possible because only a limited quantity of anti-friction agent is available (e.g., 200 liters). The belly-landing protection system 49 is preferably automatically triggered for opening the perforations by the radio altimeter signal; however, it may also be able to be manually triggered. In order for the quantity of anti-friction agent to be utilized as efficiently as possible, the control 53 can furthermore additionally comprise a manual pre-activation which, for example, already brings the perforations to an opened state in advance, for example by positive air pressure, so that the anti-friction agent can subsequently make its way very rapidly to the openings of the perforations or into the tank. More extinguishing agent can be fed into the extinguishing system by the airport fire department after the belly landing. To this end, an additional infeed point 57 has to be integrated in the front and the rear part of the aircraft and on both sides, the infeed points 57 in turn opening into the pipe system 35. This could have a positive effect on the evacuation time.

The systems and devices described herein may include a controller, control unit, controlling means, system control, processor or a computing device comprising a processing unit and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

1 Fuselage
3 Aircraft
5 Ground
7 Anti-friction agent buffer
9 Honeycomb structure
11 Perforation
13 Lower side of the honeycomb structure
15 Opening to the anti-friction agent inlet
17 Anti-friction agent
19 Air discharge holes
21 First external side of the honeycomb structure
23 Second external side of the honeycomb structure
25 First honeycomb panel
27 Second honeycomb panel
29 Irrigation system/sprinkler system
30 Cabin floor or cargo hold ceiling
31 Floor board
32a Seat rails
32b Crossbeam
33 Anti-friction system
35 Pipe system
37 Fuselage cladding
39 Inner side of the fuselage cladding
41 Outer side of the fuselage cladding
42 Anti-friction agent film
43 Supply pipe into the tank
45 Tank
47 Anti-friction agent layer
48 Fuel
49 Belly-landing protection system
51 Landing gear detector
53 Control for maintaining a closed state
55 Water tank
57 Infeed point
59 Electrical wiring

The invention claimed is:
1. A honeycomb structure comprising:
a first external side,
a second external side, and
an anti-friction agent buffer for receiving an anti-friction agent,
wherein an opening to an anti-friction agent inlet and an opening to an air outlet are present on the first external side,
wherein the honeycomb structure on the second external side has at least one perforation,
wherein the at least one perforation in a normal state is in a closed state, and
wherein the at least one perforation, by overpressure in the anti-friction agent buffer, is caused to be brought to an opened state so that the anti-friction agent is transferred from the anti-friction agent buffer through the at least one perforation onto the second external side.

2. The honeycomb structure as claimed in claim 1, having a first honeycomb panel and a second honeycomb panel, wherein the first honeycomb panel comprises the first external side of the honeycomb structure, and the second honeycomb panel comprises the second external side of the honeycomb structure.

3. An aircraft having a cabin for receiving passengers, cargo, or both, with a floor, wherein the floor comprises a honeycomb structure as claimed in claim 1.

4. The aircraft as claimed in claim 3, wherein the anti-friction agent comprises water, a fire extinguishing agent, or both.

5. The aircraft as claimed in claim 3,
wherein the aircraft comprises a fresh-water tank or a gray-water tank, or both, and
wherein supply lines of a pipe system are configured to transport water from the fresh-water tank, the gray-water tank, or both, into the anti-friction agent buffer.

6. A belly-landing protection system for an aircraft as claimed in claim 4, wherein the aircraft furthermore comprises
a landing gear;
a radio altimeter configured to establish a flight altitude of the aircraft;
a landing gear detector configured to determine whether the landing gear is extended; and
a control configured to maintain a closed state of the at least one perforation and to generate an opened state of the at least one perforation,
wherein the at least one perforation is brought to an opened state when the radio altimeter establishes a specific flight altitude, but the landing gear detector establishes that the landing gear is not yet extended.

7. The belly-landing protection system as claimed in claim 6, wherein the control comprises a manual mechanism, an automatic mechanism, or both, for bringing the at least one perforation to an opened state.

8. An aircraft having a fuselage cladding, wherein the fuselage cladding has an inner side and an outer side, wherein the fuselage cladding comprises a honeycomb structure as claimed in claim 1 so that the anti-friction agent, when the at least one perforation is in an opened state, by way of the at least one perforation makes its way onto the outer side of the fuselage cladding.

9. A method for generating an anti-friction agent film on a face of an aircraft, wherein the aircraft comprises:
a landing gear; and
a honeycomb structure as claimed in claim 1;
comprising the following steps:
establishing a specific flight altitude of the aircraft via a radio altimeter;
establishing via a landing gear detector whether the landing gear is extended; and
bringing the at least one perforation to an opened state by an overpressure of the anti-friction agent, so that the anti-friction agent flows from the anti-friction agent buffer.

10. An aircraft having a fuselage cladding, wherein the fuselage cladding has an inner side and an outer side, wherein the fuselage cladding comprises a honeycomb structure as claimed in claim 1 so that the anti-friction agent, when the at least one perforation is in an opened state, by way of the at least one perforation makes its way onto the outer side of the fuselage cladding.

11. An aircraft having a honeycomb structure as claimed in claim 1, wherein the at least one perforation opens into a pipe system for an anti-friction agent.

12. The aircraft as claimed in claim 11, wherein the pipe system opens into a tank of the aircraft that is suitable for receiving fuel.

13. A method for generating an anti-friction agent film on a face of an aircraft as claimed in claim 12, wherein the aircraft comprises:
the landing gear;
the honeycomb structure; and
the tank for receiving fuel, having an inner surface and an outer surface;
wherein the face of the aircraft is the inner surface of the tank,
comprising the following steps:
establishing a specific flight altitude of the aircraft via a radio altimeter;
establishing via a landing gear detector whether the landing gear is extended; and
bringing the at least one perforation to an opened state by an overpressure of the anti-friction agent, so that the anti-friction agent flows from the anti-friction agent buffer,
wherein the anti-friction agent has a higher density than the fuel; and
introducing the anti-friction agent through the pipe system into the tank at least partially filled with fuel, so that a lower layer with anti-friction agent and an upper layer with fuel, disposed on top of the lower layer, are formed in the tank.

* * * * *